US011866889B2

(12) United States Patent
Eul et al.

(10) Patent No.: US 11,866,889 B2
(45) Date of Patent: Jan. 9, 2024

(54) ROAD FINISHER OR FEEDER VEHICLE WITH A FIREWALL

(71) Applicant: JOSEPH VOEGELE AG, Ludwigshafen/Rhein (DE)

(72) Inventors: Achim Eul, Mannheim (DE); Henning Delius, Edenkoben (DE); Markus Erdmann, Heidelberg (DE)

(73) Assignee: JOSEPH VOEGELE AG, Ludwigshafen/Rhein (DE)

( * ) Notice: Subject to any disclaimer, the term of this patent is extended or adjusted under 35 U.S.C. 154(b) by 520 days.

(21) Appl. No.: 16/863,240

(22) Filed: Apr. 30, 2020

(65) Prior Publication Data

US 2020/0347559 A1 Nov. 5, 2020

(30) Foreign Application Priority Data

Apr. 30, 2019 (EP) ..................................... 19171727

(51) Int. Cl.
*E01C 19/48* (2006.01)
*E01C 19/12* (2006.01)
*H04L 9/40* (2022.01)

(52) U.S. Cl.
CPC .............. *E01C 19/48* (2013.01); *E01C 19/12* (2013.01); *H04L 63/02* (2013.01)

(58) Field of Classification Search
CPC ........... E01C 19/12; E01C 19/48; H04L 63/02
USPC ..................... 404/84.05–84.5, 118, 83; 701/5
See application file for complete search history.

(56) References Cited

U.S. PATENT DOCUMENTS

| | | | |
|---|---|---|---|
| 5,850,449 A | 12/1998 | McManis | |
| 7,574,821 B2* | 8/2009 | Furem | E02F 9/262 172/3 |
| 8,517,628 B2* | 8/2013 | Weiser | E01C 19/48 701/50 |
| 9,045,871 B2* | 6/2015 | Graham | E01C 19/4873 |
| 10,053,822 B2 | 8/2018 | Eul et al. | |
| 10,087,588 B2 | 10/2018 | Buschmann et al. | |

(Continued)

FOREIGN PATENT DOCUMENTS

| | | |
|---|---|---|
| CN | 213571428 U | 6/2021 |
| DE | 10 2004 033 624 A1 | 11/2005 |

(Continued)

OTHER PUBLICATIONS

Japanese Office Action dated Jul. 20, 2021 (with English Machine Translation), Application No. 2020-077948, 10 Pages.

(Continued)

*Primary Examiner* — Raymond W Addie
(74) *Attorney, Agent, or Firm* — BROOKS KUSHMAN P.C.

(57) ABSTRACT

A construction vehicle may be a road finisher or a feeder vehicle for a road finisher. The construction vehicle comprises an internal network area of the construction vehicle, which comprises a computing unit for controlling an operation of the construction vehicle, and an external network area of the construction vehicle, which is in data communication connection with the internal network area. A firewall is configured to monitor data communication from the external network area of the construction vehicle to the internal network area of the construction vehicle, wherein the firewall has its own processor and operating system.

10 Claims, 2 Drawing Sheets

(56) References Cited

U.S. PATENT DOCUMENTS

| | | | |
|---|---|---|---|
| 2005/0002354 A1* | 1/2005 | Kelly | H04W 84/18 370/329 |
| 2007/0142990 A1* | 6/2007 | Moughler | H04L 12/14 701/50 |
| 2008/0109122 A1* | 5/2008 | Ferguson | G08G 1/20 701/2 |
| 2008/0249729 A1* | 10/2008 | Martinez | G01N 3/08 73/824 |
| 2009/0146505 A1 | 6/2009 | Powell et al. | |
| 2009/0204308 A1* | 8/2009 | Manan | F02D 31/001 701/115 |
| 2012/0232961 A1* | 9/2012 | Wellman | H04W 4/40 701/2 |
| 2013/0051914 A1 | 2/2013 | Buschmann | |
| 2014/0136023 A1 | 5/2014 | Jaccoma et al. | |
| 2014/0350801 A1* | 11/2014 | Bonefas | B60R 11/04 701/50 |
| 2015/0139729 A1* | 5/2015 | Graham | E01C 19/40 404/84.1 |
| 2015/0195348 A1* | 7/2015 | Jelle | G06Q 50/08 709/201 |
| 2015/0275482 A1* | 10/2015 | Hill | E02F 3/847 701/50 |
| 2017/0010621 A1 | 1/2017 | Rio et al. | |
| 2017/0030027 A1* | 2/2017 | Frelich | E01C 19/42 |
| 2017/0205999 A1 | 7/2017 | Marsolek | |
| 2020/0347559 A1 | 11/2020 | Eul et al. | |
| 2020/0407925 A1* | 12/2020 | Hoisington | E01C 19/42 |

FOREIGN PATENT DOCUMENTS

| | | |
|---|---|---|
| DE | 10 2016 114 046 A1 | 2/2017 |
| EP | 3 075 909 A1 | 10/2016 |
| EP | 3 214 223 A1 | 9/2017 |
| JP | H09270788 A | 10/1997 |
| JP | 2002325144 A | 11/2002 |
| JP | 2003253663 A | 9/2003 |
| JP | 2011507464 A | 3/2011 |
| JP | 2013525631 A | 6/2013 |
| JP | 2016191299 A | 11/2016 |

OTHER PUBLICATIONS

Chinese Office Action dated Aug. 3, 2021 (with English Machine Translation), Application No. 202010359966.X, 12 Pages.

Japanese Office Action (with English Machine Translation) dated Mar. 29, 2022, Application No. 2020-077948, 9 Pages.

Extended European Search Report dated Jun. 14, 2019, Application No. 19171727.1-1002, Applicant Joseph Voegele AG, 4 Pages.

* cited by examiner

ROAD FINISHER OR FEEDER VEHICLE WITH A FIREWALL

CROSS-REFERENCE TO RELATED APPLICATIONS

This application claims foreign priority benefits under 35 U.S.C. § 119(a)-(d) to European patent application number EP 19171727.1, filed Apr. 30, 2019, which is incorporated by reference in its entirety.

TECHNICAL FIELD

The disclosure relates to the field of road finishers and feeder vehicles for road finishers.

BACKGROUND

In recent years, a trend towards automation and digitalization in road construction has dramatically increased the complexity of computer systems used in road finishers and feeder vehicles for road finishers. Complex computer systems currently in use perform tasks in the area of internal control of the road finisher or feeder vehicle, for example tasks in machine control and monitoring, as well as tasks primarily in the area of data communication with external systems or an operator. EP 3 214 223 A1, for example, discloses a road finisher with an operating unit provided on the side of the chassis or the material hopper of the road finisher, which comprises an interface for unidirectional or bidirectional electronic data exchange with the road finisher.

In order to be able to coordinate the various computerized elements, which may be provided on a road finisher or on a feeder vehicle, with each other and with a central computer, a network, especially an Ethernet network, may be used. Thus, communication may be implemented reliably and based on known standards. However, the networking of different functions and components may have a negative effect on system safety.

SUMMARY

It is an object of the disclosure to provide a road finisher or a feeder vehicle for a road finisher with good safety characteristics despite a high degree of computerization, whereby this is to be achieved with devices that are as simple as possible.

According to the disclosure, a construction vehicle is provided, which is a road finisher or a feeder vehicle for a road finisher. The construction vehicle comprises a drive for providing a drive function of the construction vehicle. In addition, the construction vehicle comprises an internal network area, which comprises a computing unit for controlling an operation of the construction vehicle, and an external network area, which is in data communication connection with the internal network area. It should be noted that both the internal network area and the external network area are implemented on the construction vehicle. The terms "internal network area" and "external network area" are used for ease of reading, but could easily be replaced by the terms "first network area" and "second network area".

The construction vehicle further comprises a firewall configured to monitor data communication from the external network area of the construction vehicle to the internal network area of the construction vehicle. The firewall has its own processor and operating system. In particular, the firewall may have its own software and/or firmware.

By providing the firewall, a network separation between the internal network are and the external network area is achieved on the construction vehicle. The internal and the external network areas are clearly and unambiguously separated by the firewall. The firewall may protect the internal network area of the construction vehicle from unwanted network access from the external network area.

Based on the network separation, for example, particularly safety-critical functions of the construction vehicle and functions to which no external access is required may be implemented in the internal network area, while non-safely-critical functions and equipment for data communication with external networks, devices or storage media may be provided in the external network area.

Since the firewall has its own processor and operating system, there is an independent security level between the external and internal network areas. This is advantageous in comparison with protective mechanisms implemented on the computing unit for controlling the construction vehicle, since unsafe data may be blocked before they reach the internal network area, in particular a network interface of the computing unit. In order to be filtered, data do not have to enter the computing unit first, which could endanger the computing unit.

The internal network area and the external network area may be at least partially designed as Ethernet networks. It would also be conceivable that at least parts of the internal network area and/or parts of the external network area are implemented via wireless connections, for example via WLAN.

The external network area may be connected to an input of the firewall. This ensures that data from the external network area must first pass through the firewall before they enter the internal network area.

An output of the firewall may be connected to a network interface of the computing unit. Data from the external network area checked by the firewall may then be transferred directly to the computing unit for further processing.

It would also be conceivable that the firewall output is connected to a switch that is part of the internal network area. The switch may then forward the data from the external network area in a suitable way to corresponding components of the internal network area. In particular, the switch may be connected to a network interface of the computing unit and thus forward data from the external network area to the computing unit.

An internal construction vehicle network, which is part of the internal network area, may also be connected to the switch. The individual parts of the internal network area may be merged via the switch before being connected to the computing unit. This saves network interfaces at the computing unit. For example, a single network interface at the computing unit, especially one connected to the switch, may be sufficient.

The internal network area of the construction vehicle may include a machine controller of the construction vehicle. The machine controller as a particularly safety-critical element of the construction vehicle is thus protected by the firewall. In particular, the machine controller may be implemented at least partially on the computing unit.

For example, the external network area of the construction vehicle may comprise an interface for data communication with an external storage medium, an interface for data communication with an external device, an interface for data communication with an external network and/or an interface for wireless data communication. These interfaces may allow data to be supplied to the construction vehicle from outside. Since the interfaces are provided in the external network area, the internal network area is protected by the firewall against harmful data, such as computer viruses or the like, introduced via these interfaces.

Efficiently, the firewall may be formed on a circuit board of the computing unit. It should be noted that the firewall nevertheless has its own processor and operating system and is only located on the circuit board of the computing unit for better use of installation space and more efficient manufacture. Alternatively, it would also be conceivable to connect the firewall as a physically external device.

A software of the firewall may be updated independently of the computing unit. Such an update may, for example, take place via an interface provided directly on the firewall or in the external network area. An independent update of the software of the firewall may be carried out quickly due to the small amount of data. In addition, there is no need for time-consuming testing on the computing unit.

The computing unit may in particular be a central computer of the construction vehicle.

BRIEF DESCRIPTION OF THE DRAWINGS

In the following, the disclosure shall be explained in more detail by way of embodiments with reference to the figures, of which

DETAILED DESCRIPTION

Figure 1:
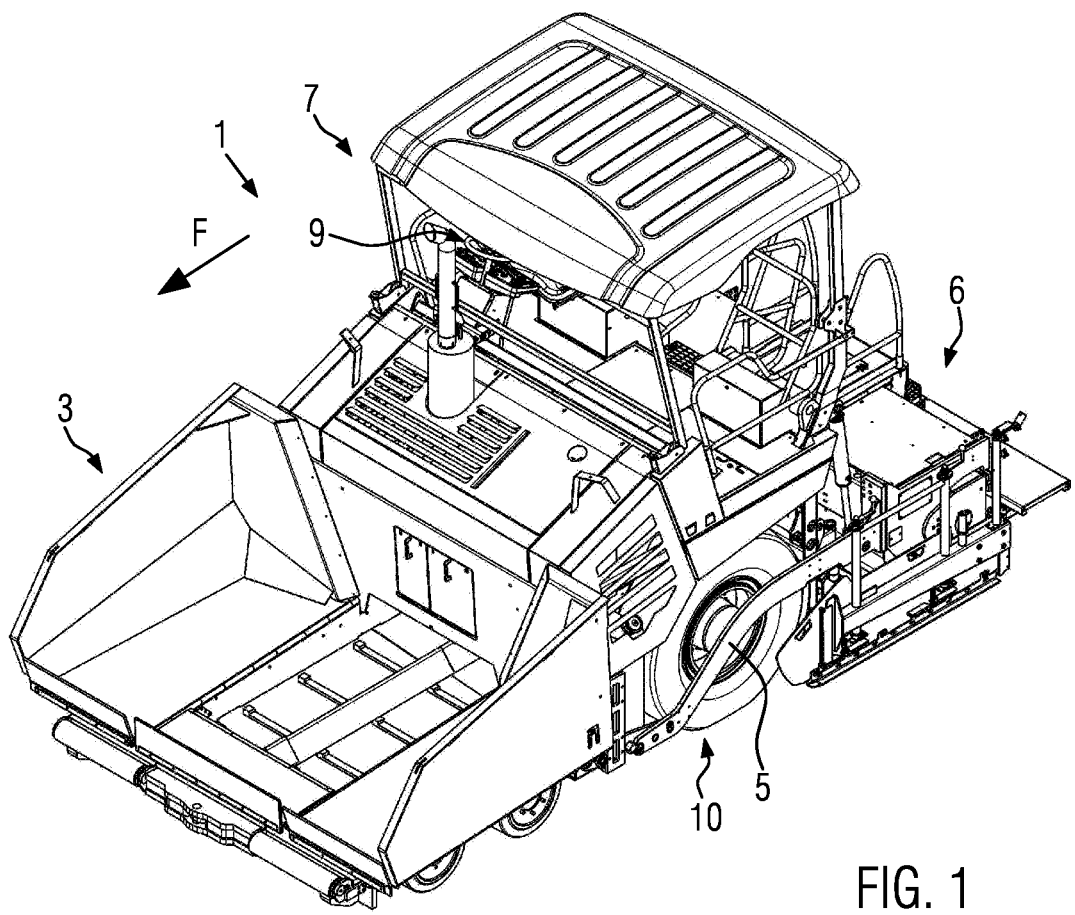
FIG. 1 shows a construction vehicle designed as a road finisher according to an embodiment.

The construction vehicle 1 according to the disclosure may be designed as a road finisher or as a feeder vehicle. FIG. 1 shows a schematic view of a construction vehicle 1 designed as a road finisher. The road finisher comprises a material hopper 3 for receiving paving material, which hopper is located at the front in relation to a paving drive direction F. During a paving operation, the paving material is conveyed in the opposite direction to the paving drive direction F into a rear area of the road finisher, where it is presented to a paving screed 6 for compaction, which screed is towed behind the road finisher on tow bars 5. The paving screed 6 is equipped with compacting units, such as a vibratory drive and a tamper bar, for compacting the paving material. On an operating platform 7 of the road finisher, operating devices 9 are arranged enabling an operator to control machine functions of the road finisher, such as a drive 10 or the compaction units.

Figure 2:
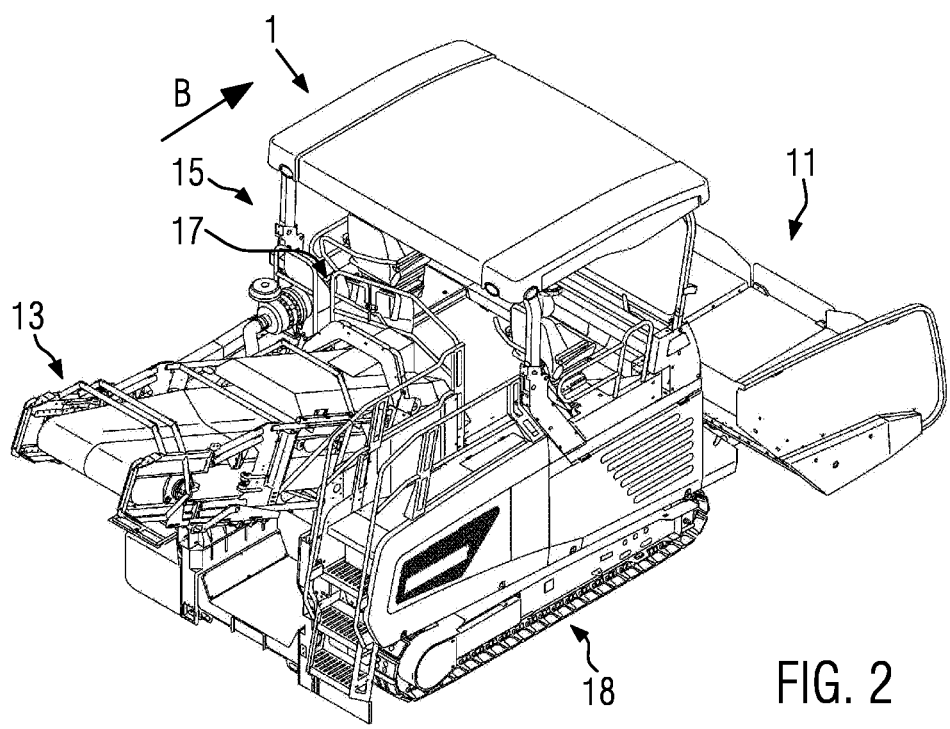
FIG. 2 shows a construction vehicle designed as a feeder vehicle for a road finisher according to an embodiment.

FIG. 2 shows a version of the construction vehicle 1 according to the disclosure as a feeder vehicle for a road finisher. The feeder vehicle is designed to supply a road paver with paving material by filling the material hopper 3 of the road finisher. This may be done, in particular, during a paving drive by the feeder vehicle moving in front of the road finisher while it is filling the material hopper 3 thereof. The feeder vehicle comprises a receiving hopper 11 at the front with respect to a feeder drive direction B for receiving paving material, e.g., paving material from a delivery truck. The paving material is conveyed against the feeder drive direction B into a rear area of the feeder vehicle, from where it is transferred using a conveyor 13 of the feeder vehicle into the material hopper 3 of the road finisher driving behind the feeder vehicle. Operating devices 17 are provided on an operating platform 15 of the feeder vehicle, with which an operator may control machine functions of the feeder vehicle, for example a drive 18.

The construction vehicle 1, both in its design as a road finisher and in its design as a feeder vehicle, comprises a computing unit 19 for controlling the operation of the construction vehicle 1. In the illustrated embodiment, the computing unit 19 is designed as the central computer of the construction vehicle 1. The computing unit 19 may be connected to the operating devices 9, 17 on the operating platform 7, 15 of the construction vehicle 1 in order to receive user instructions. The computing unit 19 may be part of a machine control system of the construction vehicle 1 for controlling and/or regulating individual working components of the construction vehicle 1. In the case of a road finisher, the computing unit 19 may, for example, control the drive 10, material conveying devices of the road finisher and compaction units of the paving screed 6. In the case of a feeder vehicle, the computing unit 19 may control, for example, the drive 18 and the operation of the conveyor 13.

Figure 3:
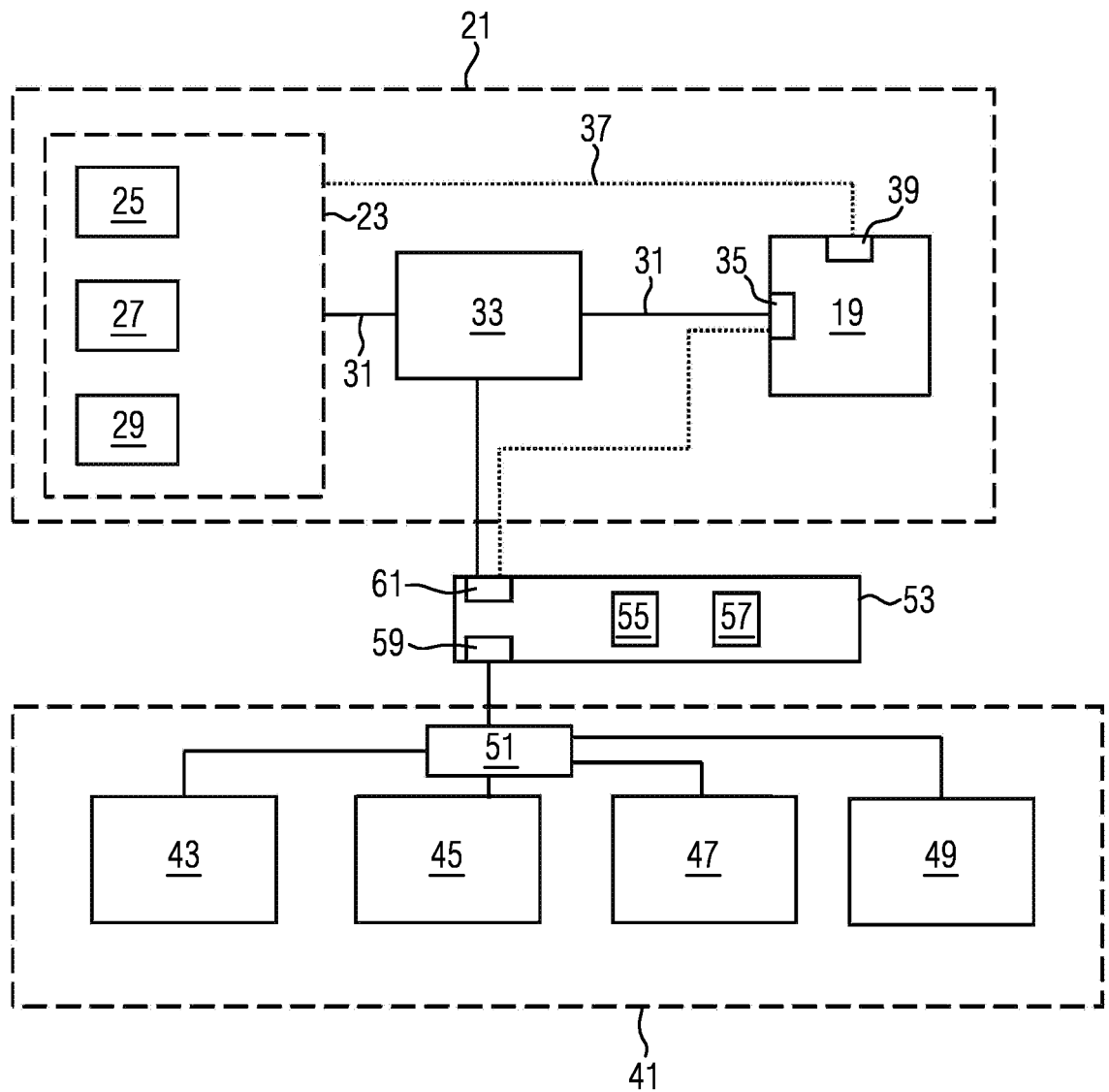
FIG. 3 shows a network diagram of a construction vehicle represented as a block diagram according to an embodiment.

In order to better coordinate and network individual components and functions of the construction vehicle 1 with one another and, if necessary, to permit the use of externally obtained data, the computing unit 19 is integrated into a network system of the construction machine 1. FIG. 3 shows as a schematic block diagram a structure of the network architecture of the construction vehicle 1. The network of the construction vehicle 1 comprises an internal network area 21, which also includes the computing unit 19. In the embodiment shown, the internal network area 21 also comprises an internal construction vehicle network 23, which may have a large number of network participants. For example, sensor devices 25 of the construction vehicle 1 could be part of the internal construction vehicle network 23. Decentralized control devices 27 could also be part of the internal construction vehicle network 23 for mutual coordination and/or for providing data for the operator or for operational data acquisition. It would also be conceivable that, for example, data storage devices 29 of the construction vehicle 1 are part of the internal construction vehicle network 23, in order, for example, to be able to centrally store data collected by the construction vehicle 1 or to provide data for the operation of the construction vehicle 1 or for inspection by an operator. The internal construction vehicle network 23 may be connected to a network interface 35 of the computing unit 19 via a switch 33, as shown in FIG. 3 by the network connections 31. Alternatively, it would also be conceivable that the internal construction vehicle network 23 is directly connected to a network interface 39 of the computing unit 19 via a network connection 37 shown dashed in FIG. 3.

The internal network area 21 of the construction vehicle 1 may comprise network participants that do not necessarily have to be supplied directly with data supplied from outside the construction vehicle 1. The internal network area 21 may be self-contained and thus represent a safe network area 21 in itself. It is particularly advantageous when safety-critical system areas, such as the computing unit 19, are provided in the internal network area 21.

Moreover, the construction vehicle 1 comprises an external network area 41 which is separate from the internal network area 21. The external network area 41 primarily comprises network participants that are intended for data communication with external systems or that operate such data communication. For example, the external network area 41 may comprise an interface 43 for data communication with an external storage medium, for example a USB stick, a hard disk, an IC card or the like, an interface 45 for data communication with an external device, for example a tablet or smartphone or another input device, an interface 47 for connection to an external network area, in particular an external construction site network or the internet, and/or an interface 49 for wireless data communication, for example a WLAN module. The corresponding network participants 43, 45, 47, 49 of the external network area 41 may in particular each have their own control. The individual network participants 43, 45, 47, 49 of the external network area 41 may optionally be connected to each other via a switch 51 of the external network area 41.

As shown in FIG. 3, the internal network area 21 and the external network area 41, which otherwise exist as separate network areas, are interconnected via a firewall 53. The firewall 53 is configured to monitor data communication from the external network area 41 of the construction vehicle 1 to the internal network area 21 of the construction vehicle 1. The firewall 53 is designed as a hardware firewall and has its own processor 55 and a memory unit 57 for storing program instructions and its own firewall 53 operating system. In particular, the memory unit 57 may store software and/or firmware of the firewall 53. In order to save installation space and simplify manufacture, the firewall 53 may be designed on a circuit board of the computing unit 19. It should be noted, however, that the firewall 53 nevertheless runs independently of the system of the computing unit 19. The firewall 53 may comprise software stored on the memory unit 57 with data monitoring rules to filter suspicious data packets during communication from the external network area 41 to the internal network area 21 and thus protect the internal network area 21 from unwanted network access.

The external network area 41 is, in the embodiment shown, connected via the switch 51 of the external network area 41 to an interface of the firewall 53 designed as input 59 of the firewall 53. Via an interface of the firewall 53 designed as output 61 of the firewall 53, data sent from the external network area 41 are forwarded to the internal network area after being checked and, if necessary, filtered by the firewall 53.

It is particularly preferred when the output 61 of the firewall 53 is connected to the switch 33 of the internal network area 21. In this way, the internal construction vehicle network 23 and the external network area 41 (after passing through the firewall 53) may be merged and then connected to the computing unit 19 via a single network interface 35 of the computing unit 19. This may save network interfaces 35, 39 on the computing unit 19.

Alternatively, however, it would also be conceivable to connect the output 61 of the firewall 53 directly to a network interface 35 of the computing unit 19 (shown with dotted lines in FIG. 3).

The software of the firewall 53 may be configured to be updated independently of the computing unit 19. For example, updated software for the firewall 53 may be supplied via one of the interfaces 43, 45, 47, 49 of the external network area 41.

What is claimed is:

1. A construction vehicle which is a road finisher or a feeder vehicle for a road finisher, comprising:
   a drive for providing a drive function of the construction vehicle;
   an internal network area of the construction vehicle, the internal network area comprising a computing unit for controlling an operation of the construction vehicle;
   an external network area of the construction vehicle, the external network area being in data communication connection with the internal network area; and
   a firewall configured to monitor data communication from the external network area of the construction vehicle to the internal network area of the construction vehicle, wherein the firewall has its own processor and its own operating system, and wherein the firewall is formed on a circuit board of the computing unit;
   wherein the external network area of the construction vehicle comprises an interface for data communication with an external storage medium, an interface for data communication with an external device, an interface for data communication with an external network and/or an interface for wireless data communication.

2. The construction vehicle according to claim 1, wherein the external network area is connected to an input of the firewall.

3. The construction vehicle according to claim 1, wherein an output of the firewall is connected to a network interface of the computing unit.

4. The construction vehicle according to claim 1, wherein an output of the firewall is connected to a switch which is part of the internal network area and which is connected to a network interface of the computing unit.

5. The construction vehicle according to claim 4, wherein the internal network area comprises an internal construction vehicle network that is connected to the switch.

6. The construction vehicle according to claim 1, wherein the internal network area of the construction vehicle comprises a machine controller.

7. The construction vehicle according to claim 1, wherein the firewall is formed on a circuit board of the computing unit.

8. The construction vehicle according to claim 1, wherein software of the firewall is configured to be updated independently of the computing unit.

9. The construction vehicle according to claim 1, wherein the computing unit is designed as a central computer of the construction vehicle.

10. A construction vehicle which is a road finisher or a feeder vehicle for a road finisher, comprising:
    a drive for providing a drive function of the construction vehicle;
    an internal network area of the construction vehicle, the internal network area comprising a computing unit for controlling an operation of the construction vehicle;
    an external network area of the construction vehicle, the external network area being in data communication connection with the internal network area; and
    a firewall configured to monitor data communication from the external network area of the construction vehicle to the internal network area of the construction vehicle, wherein the firewall has its own processor and its own operating system, and wherein the firewall is formed on a circuit board of the computing unit.

\* \* \* \* \*